United States Patent

Hay, II. et al.

[11] 3,874,983
[45] Apr. 1, 1975

[54] LAMINATE CONSTRUCTION

[75] Inventors: Robert A. Hay, II.; John A. De Bliek, both of Midland, Mich.

[73] Assignee: The Dow Chemical Company, Midland, Mich.

[22] Filed: Dec. 17, 1973

[21] Appl. No.: 425,490

[52] U.S. Cl. .................. 161/102, 52/309, 52/520, 52/528, 156/227, 156/304, 161/36, 161/118, 161/145, 161/147, 161/160, 161/167
[51] Int. Cl. ............................................. B32b 3/04
[58] Field of Search .......... 161/102, 103, 104, 105, 161/106, 107, 108, 36, 37, 38, 118, 121, 123, 126, 132, 160, 161, 167; 52/520, 528, 309; 156/227, 304

[56] References Cited
UNITED STATES PATENTS

| | | | |
|---|---|---|---|
| 3,387,420 | 6/1968 | Long | 161/123 |
| 3,455,076 | 7/1969 | Clarool | 161/123 |
| 3,496,058 | 2/1970 | Schroter et al. | 161/123 |
| 3,519,523 | 7/1970 | Rodman et al. | 161/36 |

*Primary Examiner*—William J. Van Balen
*Attorney, Agent, or Firm*—Robert B. Ingraham

[57] ABSTRACT

Structures are prepared using foam strips having a laminate on at least one surface of the foam, the laminate is adhesively bonded to the surface and folded outwardly about 180° at each edge. As strips are bonded together, one edge of the laminate is unfolded to overlap and cover the adjacent edge of an adjacent laminate. Improved bond reliability is obtained as well as ease of handling.

7 Claims, 2 Drawing Figures

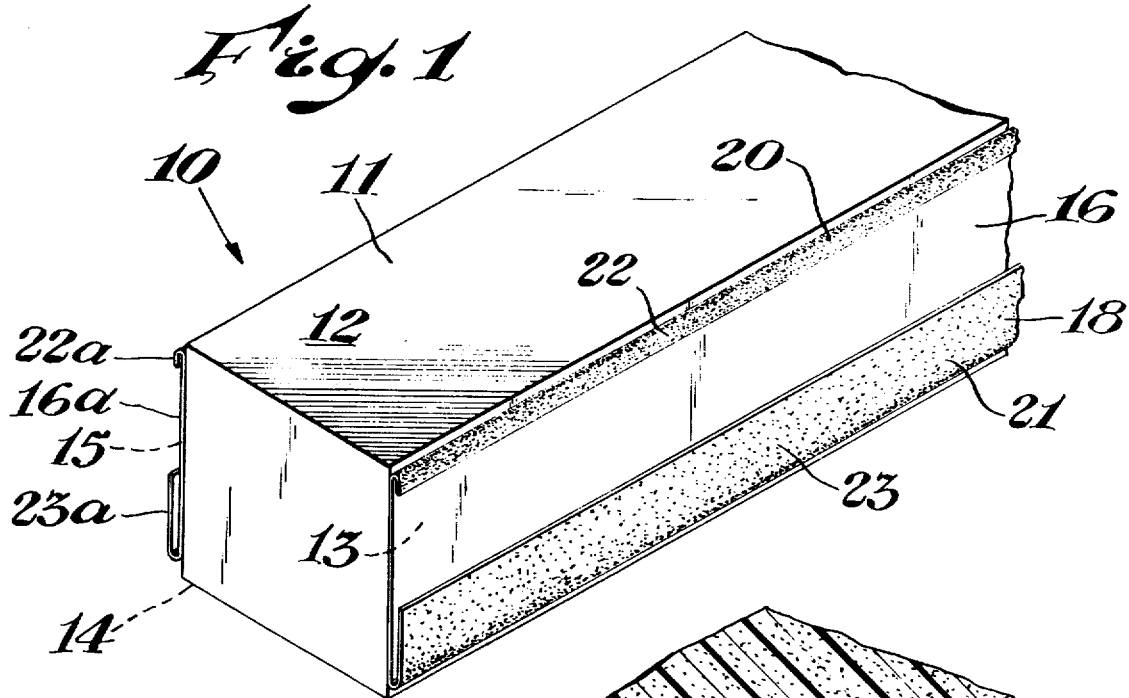
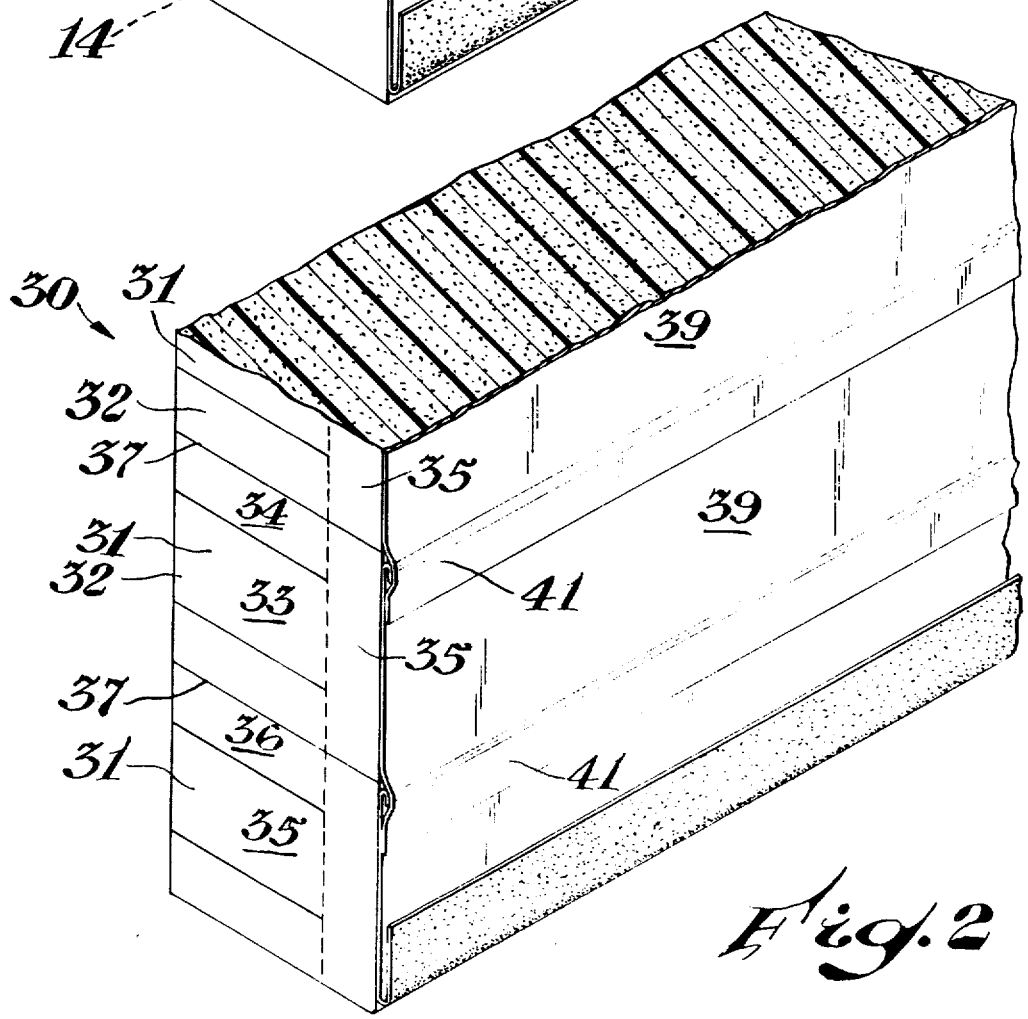

LAMINATE CONSTRUCTION

It is known to prepare structures by bonding adjacent strips of synthetic resinous material to each other. One typical process and structure is described in U.S. Pat. No. 3,206,899, the teachings of which are herewith incorporated by reference thereto. In the preparation of such foam structures prepared from elongate strips, it is generally desirable to have an external surface which is more or less impermeable to water, weather and the like. One particularly convenient mode of providing a weather resistant surface has been to adhere a flexible metal foil to the surface of the structure. Conveniently, the metal foil has on at least one surface thereof a heat activable adhesive which permits lamination of the foil or strip to a face of the foamed plastic substrate. It is desirable in many instances to laminate the foil to the foam prior to bonding of foam strips to form the desired structure. In order to obtain continuity of the foil surface beneficially the foil strip has a width substantially greater than the width or height of the foam plastic strip. For handling convenience generally the portion of the metal strip which extends beyond and is not adhered to the elongate plastic member is folded about 180°. When the strip is joined to an adjacent strip the folded portion is unfolded to overlay the previously deposited strip and adhered thereto. Such joints have not been entirely satisfactory; that is, they were not liquid-tight joints and required extensive hand work to assure that the desired bond is obtained between adjacent layers. Such a problem is particularly severe when a spherical or curved structure is being prepared by the hereinbefore set forth spiral generation process. Difficulty has also been encountered in handling such strips. When the metal layer of the foam/metal laminate has one edge directly affixed to the foam, tearing of the metal occasionally results, particularly when the laminate is bent and the metal layer is on the convex side. Further, such a laminate shows a very undesirable tendency to twist when the strip is curved and considerable force must be applied to realign the strip into the desired position for application to the structure. Oftentimes such spirally generated structures can be employed with benefit for the insulation of cryogenic tanks which may contain flammable materials such as liquefied natural gas. From a safety standpoint, it is very desirable that the foam insulation be protected from exposure to such flammable material. Therefore, a reliable and strong joint is desired between adjacent metal facings.

It would be desirable if there were available an improved method for the preparation of spirally generated structures.

It would also be desirable if there were available an improved foam plastic/metal laminate for the preparation of structures wherein adjacent foam/metal laminate bodies are adhered together.

It would further be desirable if there were available an improved foam/metal laminate for the preparation of structures which had a reduced tendency to twist and for the metal to tear during handling.

These benefits and other advantages in accordance with the present invention are achieved in an improvement in a process for the preparation of a structure wherein a foam plastic/metal laminate body is provided, the body having an elongate generally rectangular configuration and a metal layer adhered to at least one surface, the metal laminate having at least a first edge and a second edge wherein the second edge of the metal is not adhered to the foam but folded back upon itself, the elongate foam/metal laminate body being applied to a generally like foam/metal laminate body wherein the second edge of the metal layer is disposed adjacent the first edge of the previously deposited metal layer of a foam plastic/metal laminate and the portion of the second edge of the metal layer unfolded and joined to the adjacent metal layer in the region of the first edge of the adjacent metal layer, the improvement which comprises folding a portion of the first edge of the layer of the laminate about 180° in a direction away from the foam portion of the foam plastic/metal laminate, the fold in the first edge being substantially narrower than that in the second edge.

Also contemplated within the scope of the present invention is an improved foam/metal laminate suitable for the preparation of walled structures, the foam/metal laminate comprising a generally rectangular elongate foam plastic body having a generally rectangular cross-sectional configuration, a metal layer comprising a metal sheet having on one surface thereof an adhesive, a major portion of the adhesive adhered to one face of the foam plastic member, the elongate metal strip having a first edge and a second edge, the first and second edges of the metal sheet extending in the direction of the major dimension of the elongate body, each of the edges being folded about 180° inwardly, thereby disposing remote from the foam a portion of the adhesive layer adjacent the first and second edges, the width of the fold at the first edge being substantially less than the width of the fold at the second edge and the total width of the metal being greater than the width of the adjacent portion of the foam body.

Further features and advantages of the present invention will become more apparent from the following specification taken in connection with the drawing wherein:

FIG. 1 is a schematic isometric representation of a foam plastic/metal laminate in accordance with the present invention.

FIG. 2 is a schematic isometric representation of a number of bodies in accordance with the invention adhered together to form a wall.

In FIG. 1 there is schematically depicted a fractional view of one end of a laminate in accordance with the present invention generally designated by the reference numeral 10. The laminate 10 comprises an elongate foam plastic body 11 such as foamed polystyrene, foamed polyurethane and the like. The body 11 has a first major face 12, a second major face 13, a third major face 14 and a fourth major face 15. The body 11 has a generally rectangular cross-sectional configuration. Adjacent the second face 13 and adhered thereto is a metal/adhesive laminate 16. The metal/adhesive laminate 16 comprises a first or outer skin layer 17 of a readily deformable metal such as aluminum, copper or the like. The layer 17 has adhered thereto an adhesive layer 18 which serves to adhere the layer 17 to the face 13 of the body 11. Advantageously, the adhesive layer 18 is a heat activable or hot melt adhesive such as a copolymer of 83 percent ethylene and 17 percent acrylic acid, bitumen or the like. Alternately, settable adhesives such as epoxy resins may be employed. The layer 16 has a first edge 20 and a second edge 21 extending generally along the major edges of the face 13. A first fold 22 is disposed along the first edge 20 and extends generally the entire length of the laminate 10. The fold 22 is formed by folding the laminate 16 about 180° to dispose the adhesive 18 remote from the foam face 13 of the foam body 11. A generally similar fold 23 is disposed adjacent the second edge 21 of the metal laminate 16. The width of the fold 23 is substantially greater than that of the fold 22. Beneficially, the width of the fold 23 is from about 1.5 to 10 times the width of the fold 22. A similar laminate 16a is adhered to the face 15 and the components thereof designated by reference numerals bearing the suffix a.

In FIG. 2 there is disclosed a fractional isometric view of a structure wall portion prepared from laminates in accordance with the invention and designated by the reference numeral 30. The structure 30 comprises a plurality of laminates 31, each of the laminates 31 having a foam body 32 composed of previously laminated foam elements 33, 34, 35 and 36. Adjacent foam bodies 31 are directly adhered to each other at locations indicated by the reference numeral 37. Adhered to the surface of the foam portion 35 remote from the portions 33, 34 and 36 are malleable metal foils 39 equivalent to the foil 16 and 16a of FIG. 1. Adjacent foils 39 are overlapped and heat sealed or otherwise adhered in regions designated by the reference numeral 41. Prior to heat sealing, the second or larger fold has been unfolded, placed over the immediately adjacent smaller fold of the adjacent laminate 31 and heat sealed or otherwise adhered to both the exposed adhesive of the smaller or first fold and to a portion of the exterior surface of the laminate 39, thus providing a direct adhesive-to-adhesive seal as well as an adhesive-to-metal seal.

Employing the laminates and method of the present invention, reliably bonded structures are readily prepared from plastic foam/metal laminates, polystyrene, aluminum, polyurethane, copper and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a process for the preparation of a structure wherein a foam plastic/metal laminate body is provided, the body having an elongate generally rectangular configuration and a metal layer adhered to at least one surface, the metal laminate having at least a first edge and a second edge wherein the second edge of the metal is not adhered to the foam but is folded back upon itself, the elongate foam/metal laminate body being applied to a generally like foam/metal laminate body wherein the second edge of the metal layer is disposed adjacent the first edge of the previously deposited metal layer of a foam plastic/metal laminate and the portion of the second edge of the metal layer unfolded and joined to the adjacent metal layer in the region of the first edge of the adjacent metal layer, the improvement which comprises folding a portion of the first edge of the layer of the laminate about 180° in a direction away from the foam portion of the foam plastic/metal laminate, the fold in the first edge being substantially narrower than that in the second edge.

2. The method of claim 1 wherein joining is accomplished by heat sealing.

3. The method of claim 1 wherein joining is accomplished by settable adhesives.

4. The method of claim 1 wherein the foam is a polystyrene foam and the metal is aluminum.

5. An improved foam/metal laminate suitable for the preparation of walled structures, the foam/metal laminate comprising a generally rectangular elongate foam plastic body having a generally rectangular cross-sectional configuration, a metal layer comprising a metal sheet having on one surface thereof an adhesive, a major portion of the adhesive adhered to one face of the foam plastic member, the elongate metal strip having a first edge and a second edge, the first and second edges of the metal sheet extending in the direction of the major dimension of the elongate body, each of the edges being folded about 180° inwardly, thereby disposing remote from the foam a portion of the adhesive adjacent the first and second edges, the width of the fold at the first edge being substantially less than the width of the fold at the second edge and the total width of the metal being greater than the width of the adjacent portion of the foam body.

6. The laminate of claim 5 wherein the adhesive is a heat activable adhesive.

7. The laminate of claim 5 wherein the foam is a polystyrene foam and the metal is aluminum.

* * * * *